United States Patent
Yun et al.

(10) Patent No.: US 9,343,918 B2
(45) Date of Patent: May 17, 2016

(54) BALANCING APPARATUS, BALANCING METHOD, AND BATTERY MODULE

(71) Applicant: Samsung Electronics Co., Ltd., Suwon-Si, Gyeonggi-Do (KR)

(72) Inventors: Jae-jung Yun, Hwaseong-si (KR); Tae-jung Yeo, Seoul (KR); Jang-pyo Park, Busan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 488 days.

(21) Appl. No.: 13/743,764

(22) Filed: Jan. 17, 2013

(65) Prior Publication Data

US 2014/0062383 A1   Mar. 6, 2014

(30) Foreign Application Priority Data

Aug. 30, 2012   (KR) ........................ 10-2012-0095959

(51) Int. Cl.
*H02J 7/00*   (2006.01)

(52) U.S. Cl.
CPC ............. *H02J 7/0054* (2013.01); *H02J 7/0016* (2013.01); *Y02T 10/7055* (2013.01)

(58) Field of Classification Search
CPC .................................................... H02J 7/0016
USPC .......................................................... 320/103
See application file for complete search history.

(56) References Cited

U.S. PATENT DOCUMENTS

| | | | |
|---|---|---|---|
| 6,538,414 | B1 | 3/2003 | Tsuruga et al. |
| 8,232,768 | B2 | 7/2012 | Hou et al. |
| 2010/0019724 | A1 | 1/2010 | Mizutani et al. |
| 2010/0244781 | A1 | 9/2010 | Kramer et al. |
| 2010/0321025 | A1 | 12/2010 | Lin et al. |
| 2011/0115436 | A1 | 5/2011 | Zhang et al. |

(Continued)

FOREIGN PATENT DOCUMENTS

| | | |
|---|---|---|
| KR | 20080013136 A | 2/2008 |
| KR | 20090064774 A | 6/2009 |

(Continued)

OTHER PUBLICATIONS

Moore, Stephen W. et al., "A Review of Cell Equalization Methods for Lithium Ion and Lithium Polymer Battery Systems", Society of Automotive Engineers, Inc, 2001-01-0959.

(Continued)

*Primary Examiner* — Thuan Do

(74) *Attorney, Agent, or Firm* — Harness, Dickey & Pierce, P.L.C.

(57) ABSTRACT

According to an example embodiment, a balancing apparatus includes: bi-directional switches that are respectively connected to cells that are connected in series, a controller configured to measure voltages of the cells, and a multiwinding transformed connected to the bi-directional switches. The bi-directional switches are configured to control a flow of an electric current bi-directionally. The controller is configured to select a number of the cells for balancing based on the measured voltages of the cells. The controller is configured to turn on and turn off the bi-directional switches that are connected to selected cells based on the measured voltages. The multi-winding transformer is configured to transfer energy between the cells when the bi-directional switches connected to the selected cells are turned on.

19 Claims, 9 Drawing Sheets

(56) References Cited

U.S. PATENT DOCUMENTS

| | | |
|---|---|---|
| 2011/0254502 A1 | 10/2011 | Yount et al. |
| 2012/0274283 A1 | 11/2012 | van Lammeren |
| 2013/0002201 A1* | 1/2013 | Bodkin et al. ............... 320/118 |

FOREIGN PATENT DOCUMENTS

| | | |
|---|---|---|
| KR | 20110010000 A | 1/2011 |
| KR | 20110029006 A | 3/2011 |
| KR | 20110096430 A | 8/2011 |
| KR | 20120026417 A | 3/2012 |

OTHER PUBLICATIONS

Zhi-Guo, Kong et al, "Comparison and Evaluation of Charge Equalization Technique for Series Connected Batteries", The Science Garden of Harbin Instistute of Technology, No. 3014.

Lee, Yuang-Shung et al., "ZCS Bi-Directional DC-to-DC Converter Application in Battery Equalization for Electric Vehicles", 35th Annual IEEE Power Electronics Specialists Conference, Aachen, Germany, 2004, pp. 2766-2772.

Mar. 13, 2015 US Office Action issued in related U.S. Appl. No. 13/755,245.

* cited by examiner

BALANCING APPARATUS, BALANCING METHOD, AND BATTERY MODULE

CROSS-REFERENCE TO RELATED APPLICATIONS

This application claims priority under 35 U.S.C. §119 to Korean Patent Application No. 10-2012-0095959, filed on Aug. 30, 2012, in the Korean Intellectual Property Office, the disclosure of which is incorporated herein in its entirety by reference.

BACKGROUND

1. Field

Some example embodiments relate to balancing apparatuses for performing a balancing between cells included in a battery, balancing methods, and/or battery modules.

2. Description of the Related Art

A battery may be formed by connecting stacks, in which a plurality of cells are connected in series, in parallel with each other in order to achieve a high voltage and a large capacity. The plurality of cells ideally all have the same characteristics as each other; however, deviations between cells (e.g., differences in capacities and/or impedances) may occur due to technical and economic factors when fabricating the cells. Such deviations may increase when the cells have temperature differences and/or the number of charging or discharging operations increase. Due to the deviations between cells, cells having less capacities may be over-charged or over-discharged during a charging or discharging operation, and thus, a balancing operation for balancing voltages of the cells may be done.

SUMMARY

Some example embodiments relate to balancing apparatuses for reducing a difference between voltages of cells, balancing methods, and/or battery modules.

Additional aspects will be set forth in part in the description which follows and, in part, will be apparent from the description, or may be learned by practice of example embodiments.

According to an example embodiment, a balancing apparatus is configured to balance cells that are connected in series. The balancing apparatus includes: bi-directional switches that are respectively connected to the cells, a controller configured to measure voltages of the cells, and a multiwinding transformer connected to the bi-directional switches. The bi-directional switches are configured to bi-directionally control a flow of an electric current. The controller is configured to select a number of the cells for balancing based on the measured voltages of the cells. The controller is configured to turn on and turn off the bi-directional switches that are connected to selected cells based on the measured voltages. The multi-winding transformer is configured to transfer energy between the selected cells when the bi-directional switches connected to the selected cells are turned on.

According to another example embodiment, a battery module includes a plurality of cells that are connected to each other in series, and the foregoing balancing apparatus. The balancing apparatus is configured to select two of the plurality of cells for balancing.

According to yet another example embodiment, a method of balancing a plurality of cells that are connected to each other in series, includes: measuring a voltage of each of the plurality of cells; selecting a number of the plurality of cells to be balanced based on the measured voltages; and controlling bi-directional switches that are respectively connected to the plurality of cells such that some of the bi-directional switches that are connected to the selected cells are turned on and turned off. The bi-directional switches are configured to control a flow of an electric current bi-directionally.

According to another example embodiment, a balancing apparatus for balancing a selected number of cells among a plurality of cells connected in series includes: a multi-winding transformer having a plurality of inductors connected in parallel to the plurality of cells; and a control architecture configured to determine the selected cells based on measured voltages of the plurality of cells. The control architecture is configured to bi-directionally transfer energy between the selected cells through one of the plurality of inductors of the multi-winding transformer.

In an example embodiment, a reset circuit may be connected to opposite terminals of the plurality of cells connected in series. The reset circuit may include a diode and a mutual inductor. The mutual inductor of the reset circuit may be correlated with the plurality of inductors of the multi-winding transformer.

In an example embodiment, the control architecture may include a plurality of bi-directional switches that are respectively connected between the plurality of inductors of the multi-winding transformers and the plurality of cells, and a controller connected to at least one of the plurality of cells and the plurality of bi-directional switches. The controller may be configured to determine the selected cells based on the measured voltages of the plurality of cells, and to balance the selected cells by turning on a selected number of the bi-directional switches that correspond to the selected cells.

In an example embodiment, at least one of the plurality of bi-directional switches may include two synchronous rectifier n-channel metal oxide semiconductors (SR-NMOSs) that have a built-in diode and capacitor.

BRIEF DESCRIPTION OF THE DRAWINGS

These and/or other aspects will become apparent and more readily appreciated from the following description of non-limiting embodiments, taken in conjunction with the accompanying drawings in which like reference characters refer to the same parts throughout the different views. The drawings are not necessarily to scale, emphasis instead being placed upon illustrating principles of example embodiments. In the drawings.

DETAILED DESCRIPTION

Figure 1:
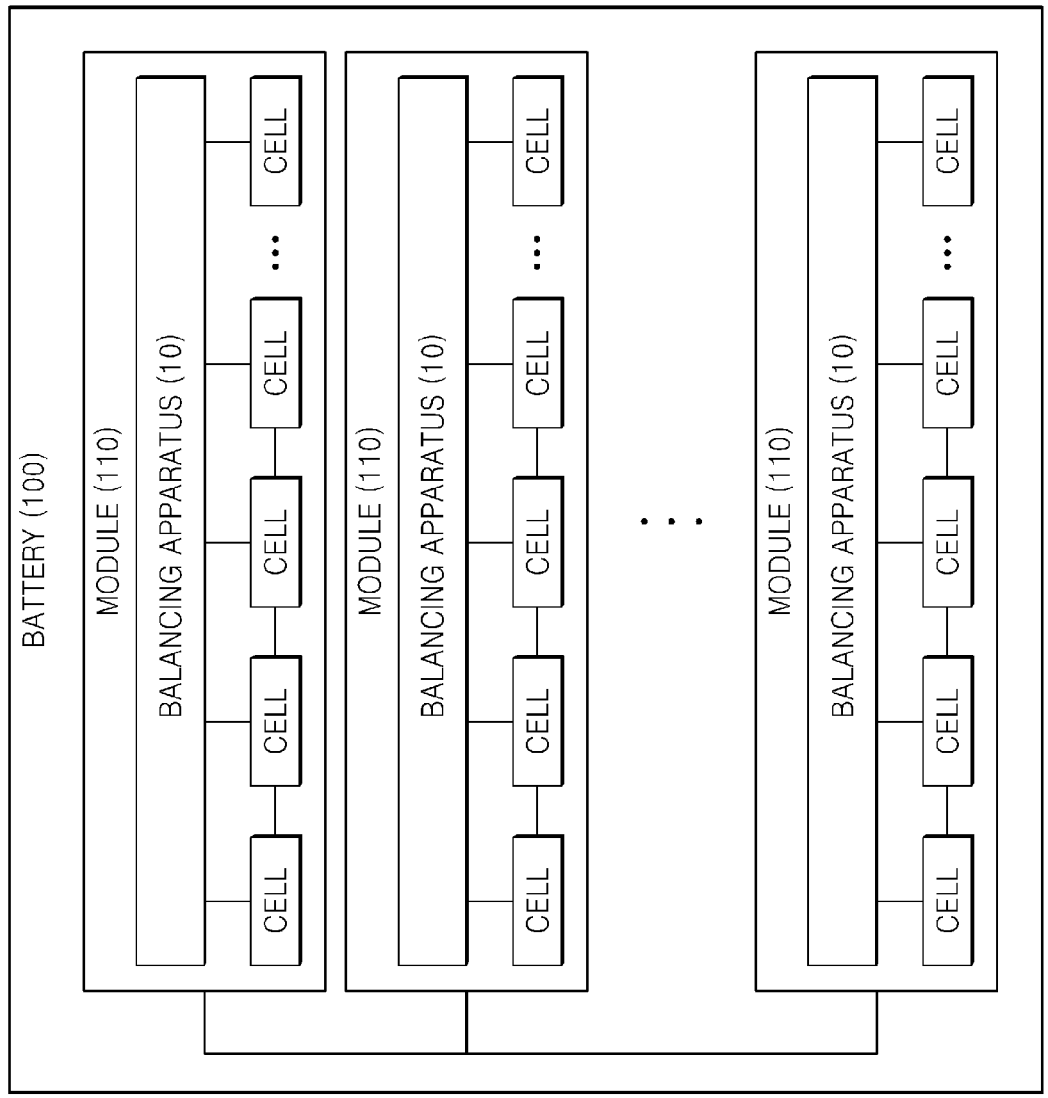
FIG. 1 is a diagram showing a battery according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and regions are exaggerated for clarity. Like reference numerals in the drawings denote like elements, and thus their description may be omitted. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram showing a battery 100 according to an example embodiment. Referring to FIG. 1, the battery 100 includes a plurality of modules 110. The battery 100 is a device for storing energy in a plurality of cells, and may be reused after a charging operation. During a charging or discharging operation of the battery 100, a difference between voltages of the plurality of cells included in the battery 100 may occur, and a voltage difference may occur between the modules 110.

Each of the modules 110 includes the plurality of cells and a balancing apparatus 10. The module 110 includes a desired (and/or alternatively predetermined) number of cells included in the battery 100. The number of cells included in one module 110 may be determined for managing the cells efficiently.

In a case where a voltage difference is generated between the cells, the balancing apparatus 10 may reduce the voltage difference between the cells and the balancing apparatus 10 may make cells have voltages that are equal to each other. In an ideal case, since the cells have the same characteristics, the voltages of the cells are equal to each other during the charging or discharging. However, differences between capacities or impedances of the cells may occur. Differences of the characteristics between the cells may cause over-charging or over-discharging of some cells. Therefore, if there is a voltage difference between the cells during the charging or discharging operation, the balancing apparatus 10 balances the voltages of the cells that have different voltages. That is, the balancing apparatus 10 transfers energy of the cell having a higher voltage to the other cell having a lower voltage so as to balance the voltages of the two cells. The balancing apparatus 10 may periodically measure the voltages of the cells and may perform the balancing operation on selected cells based on the measured voltages. For example, the balancing apparatus 10 may compare the largest voltage and the lowest voltage among the measured voltages and if a difference between the largest voltage and the lowest voltage is greater than a desired (and/or alternatively predetermined) threshold value, the balancing apparatus 10 may balance voltages of the cells that have the largest voltage and the lowest voltage, respectively.

FIG. 1 shows elements of the battery 100. However, one of ordinary skill in the art would understand that other universal elements than the elements shown in FIG. 1 may be used.

Figure 2:
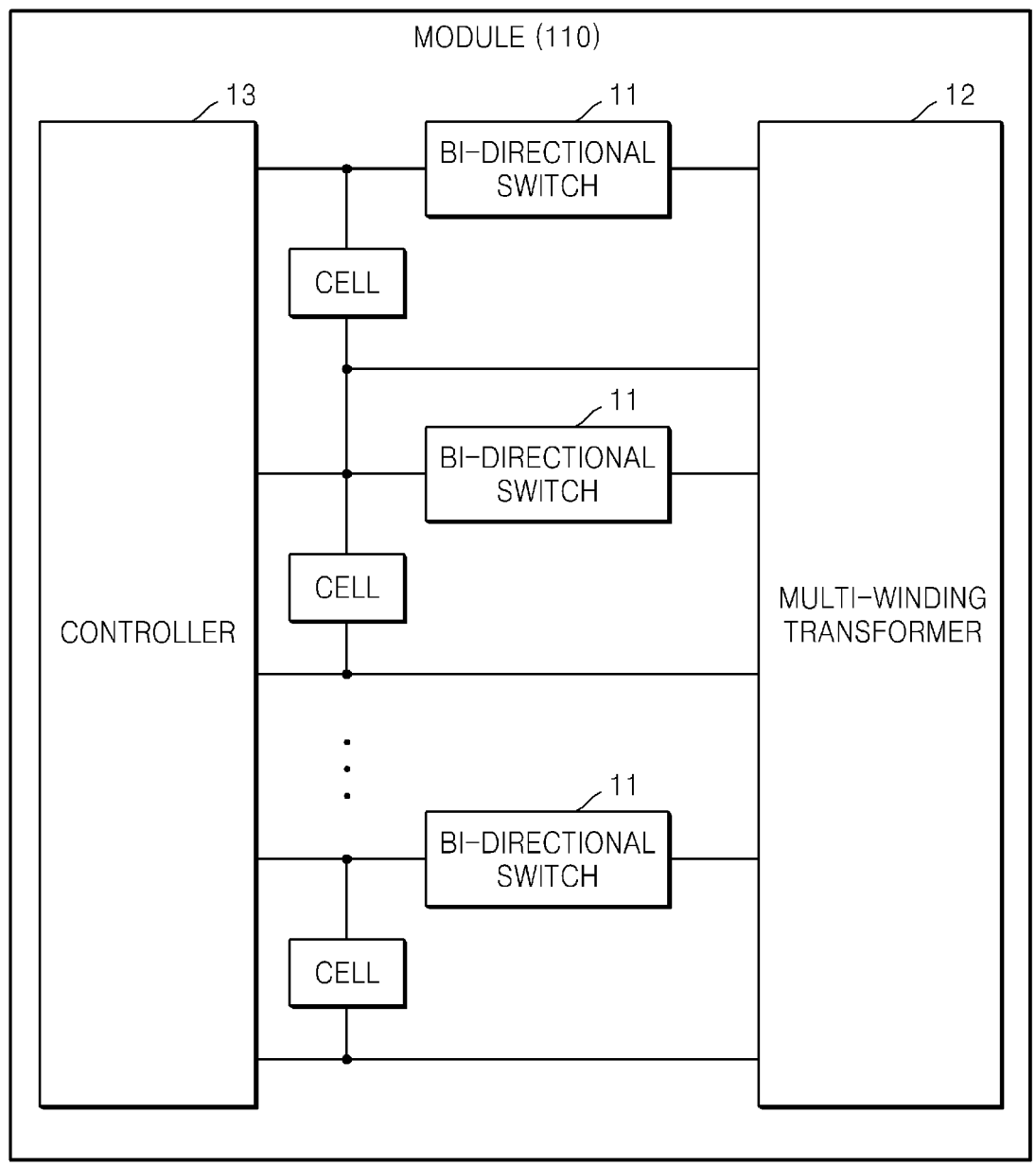
FIG. 2 is a diagram showing a balancing apparatus shown in FIG. 1.

FIG. 2 is a diagram showing an example of the balancing apparatus 10 of FIG. 1. The balancing apparatus 10 includes bi-directional switches 11, a multi-winding transformer 12, and a controller 13. The bi-directional switches 11 are located between the cells and the multi-winding transformer 12. The bi-directional switches 11 may be connected to only one of the opposite terminals of the cells. The bi-directional switches 11 may be connected to each of the cells respectively. Also, the bi-directional switch 11 may be turned on/off by the controller 13.

The bi-directional switches 11 may control a flow of the electric current flowing in opposite directions. That is, the electric current flowing in a bi-directional switch 11 may flow from a cell to the multi-winding transformer 12 or from the multi-winding transformer 12 to a cell, according to conditions.

The multi-winding transformer 12 is connected to the bi-directional switches 11. Mutual inductors of the multi-winding transformer 12 are connected to the cells, and are correlated with each other. Thus, the cells may transmit/receive energy to/from each other via the mutual inductors that are connected to the cells. For example, the multi-winding transformer 12 may include the mutual inductors and the mutual inductors of the multi-winding transformer 12 may have the same number of windings as each other.

The transferring of the energy from one cell to the other cell may be performed via the multi-winding transformer 12. The mutual inductors of the multi-winding transformer 12 are connected to the cells so as to transfer the energy from one cell to the other cell. Therefore, the energy stored in one cell may be transferred directly to the other cell. Since the energy may be transferred from one cell to the other cell without passing through a circuit unnecessarily, an energy transferring efficiency may be high.

Therefore, the balancing apparatus 10 may directly transfer or receive the energy stored in one cell to the other cell directly by using the bi-directional switch 11 and the multi-winding transformer 12.

The controller 13 may measure the voltages of the cells, select the cells based on the measured voltages, and control turning on/off of the bi-directional switches 11 connected to the selected cells. The controller 13 may measure the voltages of the cells and select the cells to be balanced. For example, the cells that need to be balanced may be the cells having the largest voltage difference therebetween. That is, the controller 13 may select the cell having the largest voltage and the cell having the lowest voltage. The controller 13 may control the bi-directional switches 11 of the selected cells for one period.

The controller 13 may receive inputs of the voltages of the cells from a sensor (not shown) that is connected to the cells. The sensor that is connected to the cells may measure the voltages of the cells and may output the measured voltages to the controller 13.

The controller 13 may select the cells for balancing based on a desired (and/or alternatively predetermined) priority. As described above, selecting the cell having the highest voltage and the cell having the lowest voltage is an example of the desired (and/or alternatively predetermined) priority. The controller 13 may set which cells are selected and balanced in advance based on the measured voltages and select the cells according to the set priority.

For example, if two or more cells have the same voltages as each other, the controller 13 may select the cells based on an order of the cells. That is, the controller 13 may assign numbers to the cells in a connecting order, and may select the cell having a smaller number. For example, if a third cell and a fourth cell show the highest voltage and a seventh cell shows the lowest voltage, the controller 13 may select one of the third and fourth cells, which will be balanced with the seventh cell. Here, if the cell having the smaller number has the priority, the controller 13 may select the third and seventh cells and controls the switches of the third and seventh cells.

The controller 13 may be implemented by a processor of a computer. For example, the controller 13 may be a program realized in hardware capable of processing calculations or algorithms.

Figure 3:
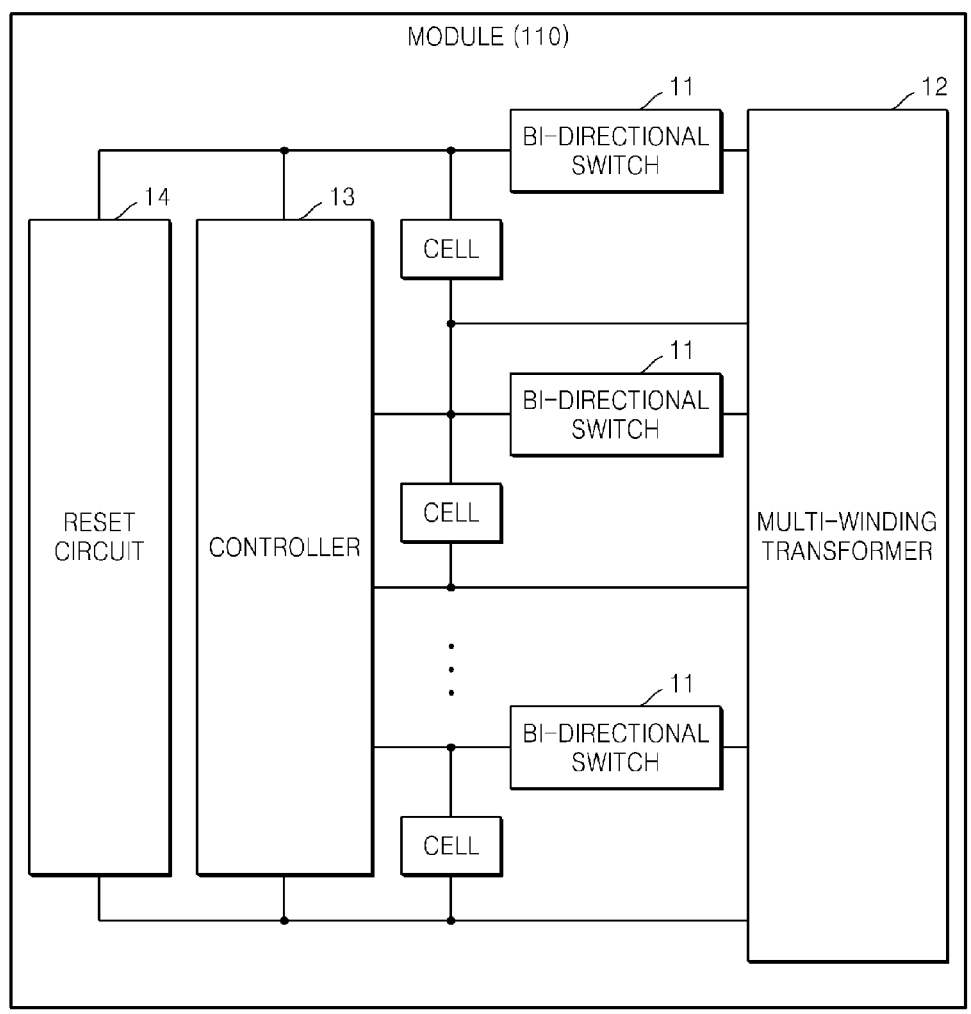
FIG. 3 is a diagram showing a balancing apparatus shown in FIG. 1.

FIG. 3 is a diagram showing another example of the balancing apparatus 10 of FIG. 1. Therefore, the above descriptions about the balancing apparatus 10 of FIG. 2 also apply to the balancing apparatus 10 according to the example of FIG. 3.

Referring to FIG. 3, the balancing apparatus 10 may further include a reset circuit 14. The reset circuit 14 may reset the energy stored in one or more of the mutual inductors of the multi-winding transformer 12. The mutual inductor of the multi-winding transformer 12 may store some of the energy while transferring the energy between the cells, and the reset circuit 14 receives the energy stored in the mutual inductor of the multi-winding transformer 12. The reset circuit 14 transfers the received energy to the module 110.

Figure 4:
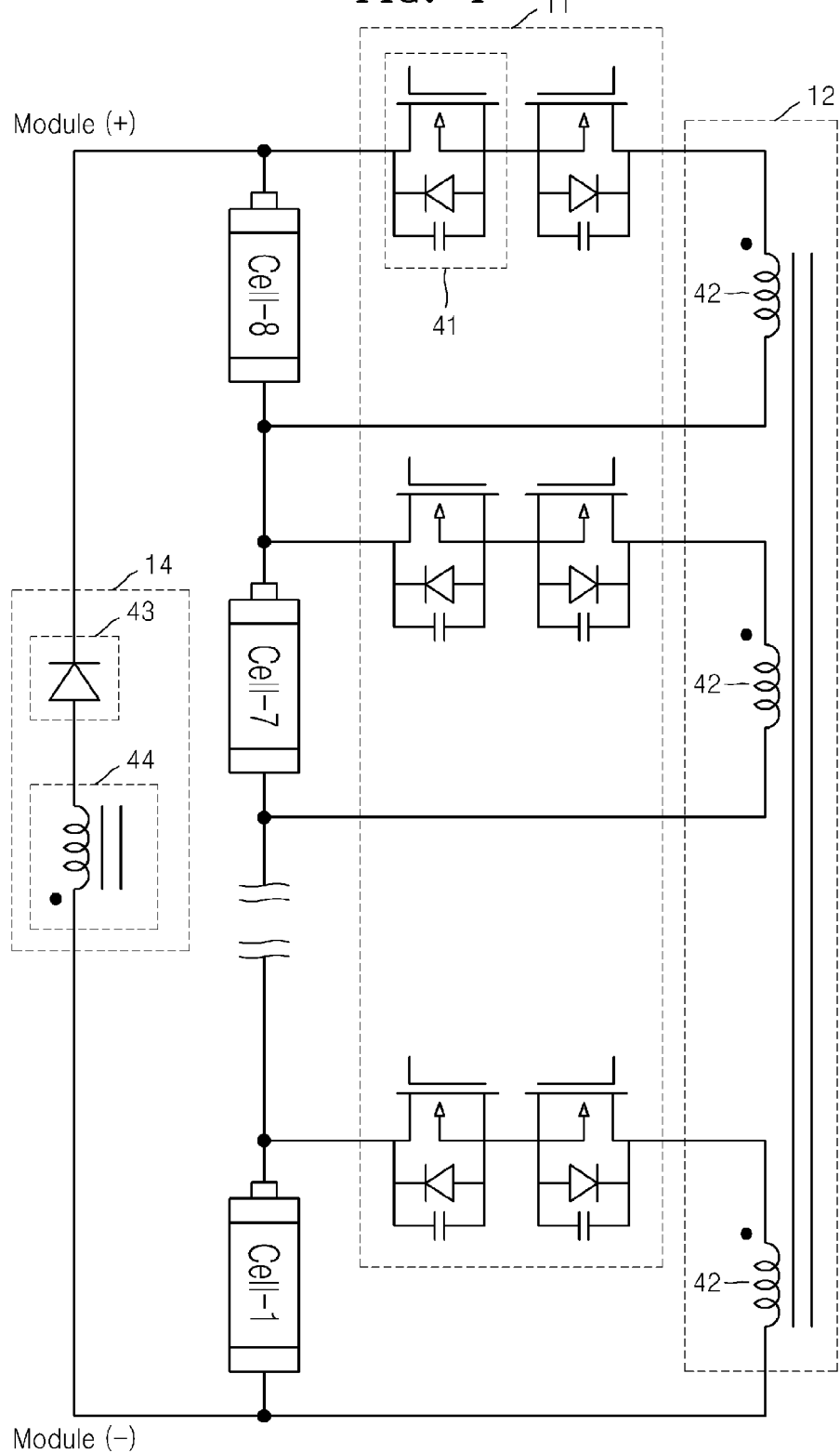
FIG. 4 is a circuit diagram of the balancing apparatus shown in FIG. 1.

FIG. 4 is a circuit diagram showing an example of the balancing apparatus 10 of FIG. 1. The bi-directional switch 11 may include two synchronous rectifier-N-channel metal oxide semiconductors (SR-NMOSs) 41, which face each other.

Each SR-NMOS 41 may include a built-in diode and a capacitor. The built-in diode and the capacitance component are included during processes of generating the SR-NMOS 41.

The multi-winding transformer 12 includes mutual inductors 42 that are respectively connected to the cells in parallel. The mutual inductors 42 may have the same polarities as each other. The mutual inductors 42 may be correlated to each other and may transfer energy between cells.

The reset circuit 14 may include a diode 43 and a mutual inductor 44 that are connected to opposite terminals of all of the cells and correlated with the mutual inductors 42 of the multi-winding transformer 12. The mutual inductor 44 of the reset circuit 14 may be correlated with the mutual inductors 42 of the multi-winding transformer 12, and may have a polarity that is opposite to those of the mutual inductors 42.

When voltages at the opposite terminals of the mutual conductor 42 in the multi-winding transformer 12 increase, voltages at the opposite terminals of the mutual inductor 44 of the reset circuit 14 may also increase. If the voltage of the mutual inductor 44 is greater than the voltage at the opposite terminals of all of the cells, the electric current flows in the reset circuit 14. When the electric current flows in the reset circuit 14, the voltage at the opposite terminals of the mutual inductor 42 of the multi-winding transformer 12 does not increase, but instead may be maintained a constant level. The number of windings of the mutual inductor 44 of the reset circuit 14 may be greater than the number of windings of the mutual inductors 42 of the multi-winding transformer 12. The peak voltage at the opposite terminals of the bi-directional switches 11 may be controlled by adjusting the number of windings of mutual inductors of the multi-winding transformer 12 and the reset circuit 14.

FIG. 5A through 5D are diagrams illustrating example operations of the balancing apparatus 10 of FIG. 4. FIGS. 5A through 5D describe operations of two selected cells Cell-1 and Cell-8 according to turning on/turning off of the switch. Here, the cell Cell-8 has a higher voltage and the cell Cell-1 has a lower voltage. Therefore, energy of the cell Cell-8 is transferred to the cell Cell-1. While FIGS. 5A through 5D illustrate example operations of the balancing apparatus 10 of FIG. 4 in which Cell-1 and Cell-8 are the selected cells, example embodiments are not limited thereto. For example, the balancing apparatus 10 may perform the same operations illustrated in FIGS. 5A through 5D when cells other than Cell-1 and Cell-8 are selected cells.

Figure 5A:
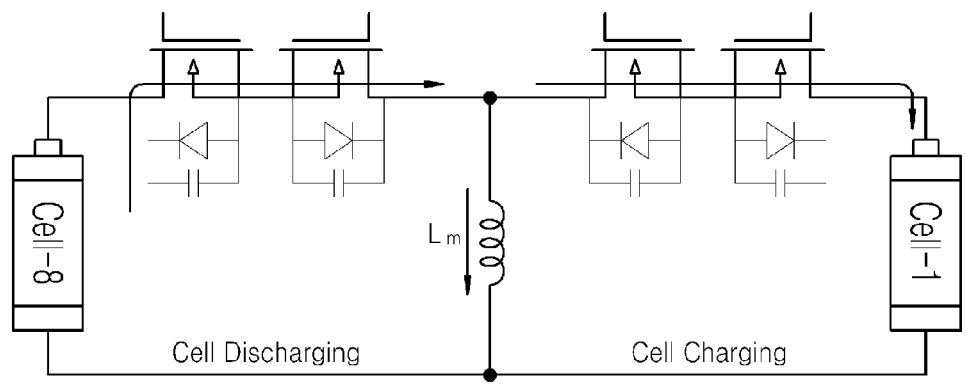
FIGS. 5A through 5D are diagrams illustrating operations of the balancing apparatus shown in FIG. 4.

FIG. 5A shows a case where the bi-directional switches 11 of the two cells Cell-1 and Cell-8 are in turned on states. When the bi-directional switches 11 of the two cells Cell-1 and Cell-8 are closed by the controller 13, the two cells Cell-1 and Cell-8 configure a circuit as shown in FIG. 5A. The electric current flows from the cell Cell-8 having the higher voltage to a mutual inductance Lm and the cell Cell-1. The cell Cell-8 is discharged, the cell Cell-1 is charged, and the mutual inductance Lm stores energy. Therefore, a voltage difference between the two cells Cell-1 and Cell-8 is reduced, and the two cells Cell-1 and Cell-8 have the same voltages as each other. Here, in order to transfer most of the energy in the cell Cell-8 to the cell Cell-1, an impedance of the mutual inductance Lm is greater than an impedance of a cell.

Also, since the bi-directional switch 11 may be configured by using two SR-NMOSs 41, when the bi-directional switch 11 is in a turned on state, the electric current may only flow through a resistance in the switch-on state of the SR-NMOS 41 without passing through the built-in diode, and thus, a conduction loss and a voltage drop due to the built-in diode may be reduced.

Figure 5B:
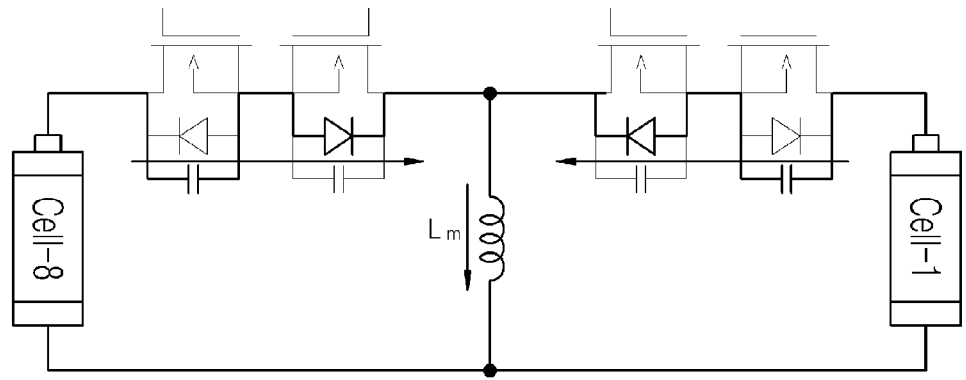
Figure 5C:
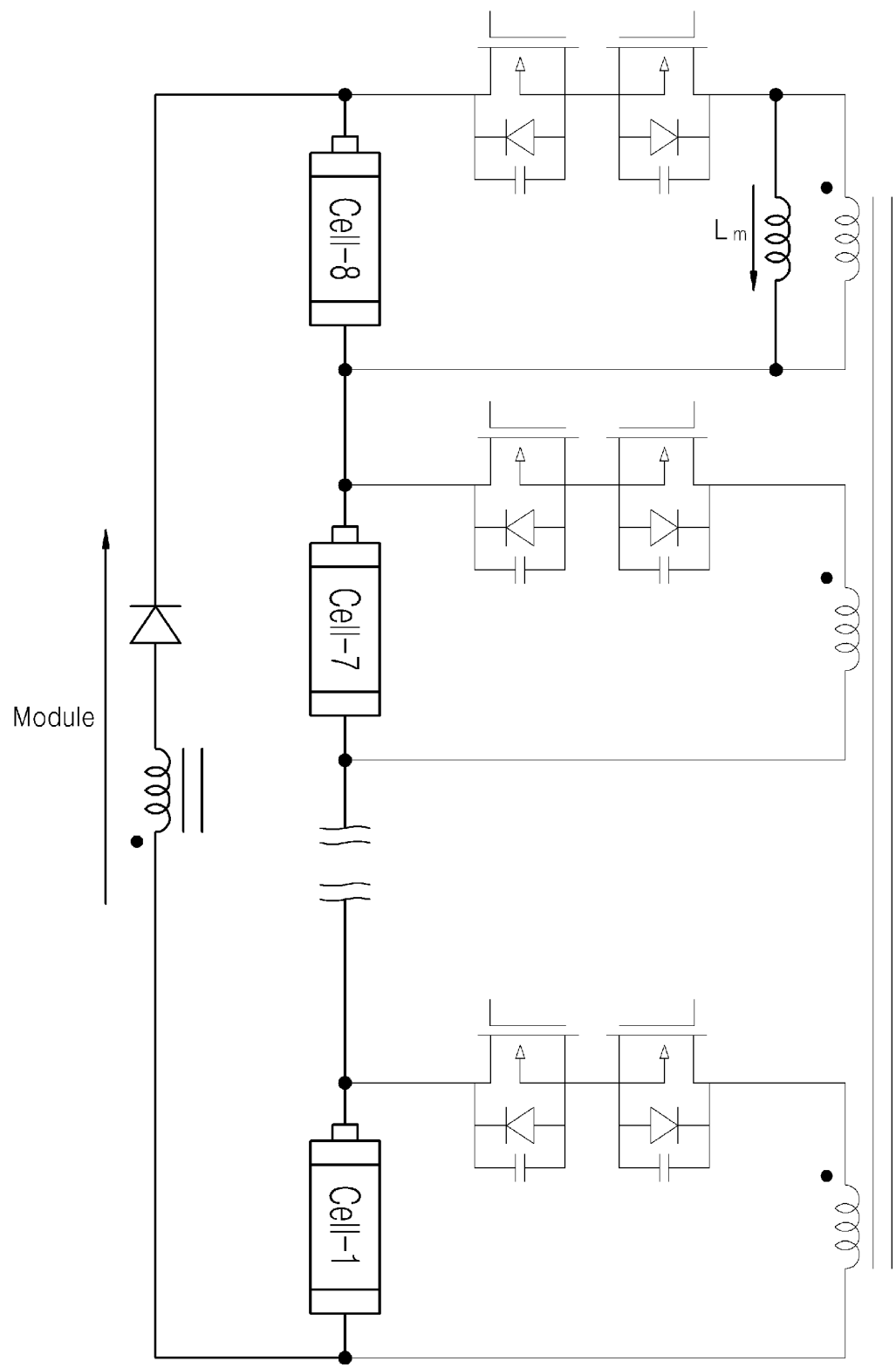
Figure 5D:
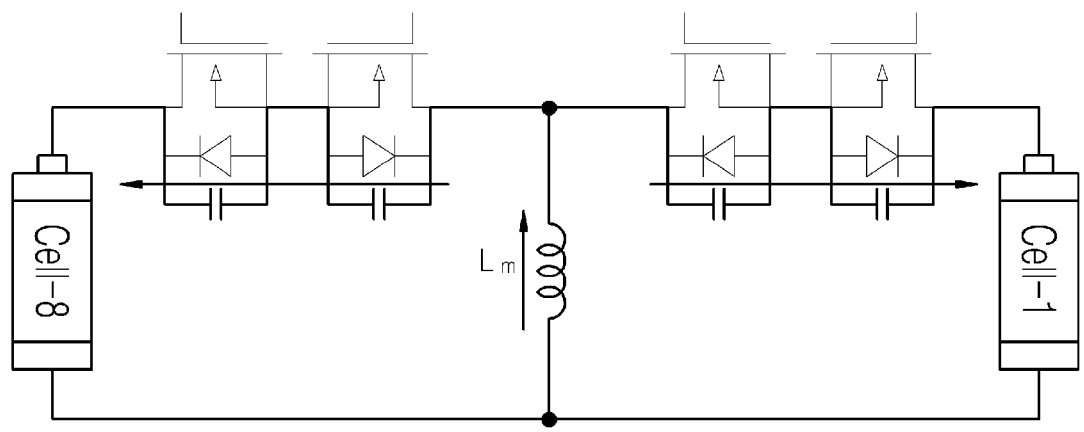

FIGS. 5B through 5D are diagrams illustrating a case where the bi-directional switches 11 of the two cells Cell-1 and Cell-8 are in turned off states.

FIG. 5B is an equivalent circuit diagram in a case where the bi-directional switches 11 of the two cells Cell-1 and Cell-8 are open. When the bi-directional switches 11 of the two cells Cell-1 and Cell-8 are turned off, a resonant circuit is formed between an output capacitor of the SR-SMOS 41 and the mutual inductance Lm. Therefore, the voltage at the opposite terminals of the bi-directional switch 11 does not increase sharply, but increases slowly as a sine wave. Here, some of the energy is stored in the mutual inductance Lm, and the electric current flowing in the bi-directional switch 11 is gradually reduced to 0 (zero) and the voltage of the bi-directional switch 11 increases gradually from 0 (zero voltage switching turn off).

FIG. 5C shows a process of resetting the energy stored in the mutual inductance of the multi-winding transformer 12 when the bi-directional switches 11 of the two cells Cell-1 and Cell-8 are opened. When the energy stored in the mutual inductance Lm increases, the voltage of the mutual inductance Lm is increased. When the voltage of the mutual inductance Lm of the multi-winding transformer 12 increases, the voltage of the mutual inductance of the reset circuit 14 that is correlated with the mutual inductance Lm of the multi-winding transformer 12 may also increase. When the voltage of the mutual inductance of the reset circuit 14 increases to be greater than the voltage at the opposite terminals of the module 110 (that is, the voltage at the opposite terminals of the cells that are connected in series), the electric current flows in the reset circuit 14 via the diode 43. Therefore, the voltage at the mutual inductance Lm of the multi-winding transformer 12 does not increase any more, and then, the voltage at the bi-directional switch 11 does not increase, and the bi-directional switch 11 has the peak voltage. Here, a polarity of the mutual inductance of the reset circuit 14 is opposite to that of the mutual inductance Lm of the multi-winding transformer 12.

FIG. 5D shows a case where the electric current does not flow in the reset circuit 14 any more when the bi-directional switches 11 of the two cells Cell-1 and Cell-8 are opened. When the electric current does not flow in the reset circuit 14, a resonant circuit is formed between the output capacitor of the SR-NMOS 41 and the mutual inductance Lm. Therefore, the voltage at the bi-directional switch 11 is gradually reduced, and the output capacitor and the mutual inductance Lm are adjusted so that the voltage of the bi-directional switch 11 becomes 0 before the bi-directional switch 11 is turned on (zero voltage switching turn on).

Figure 6:
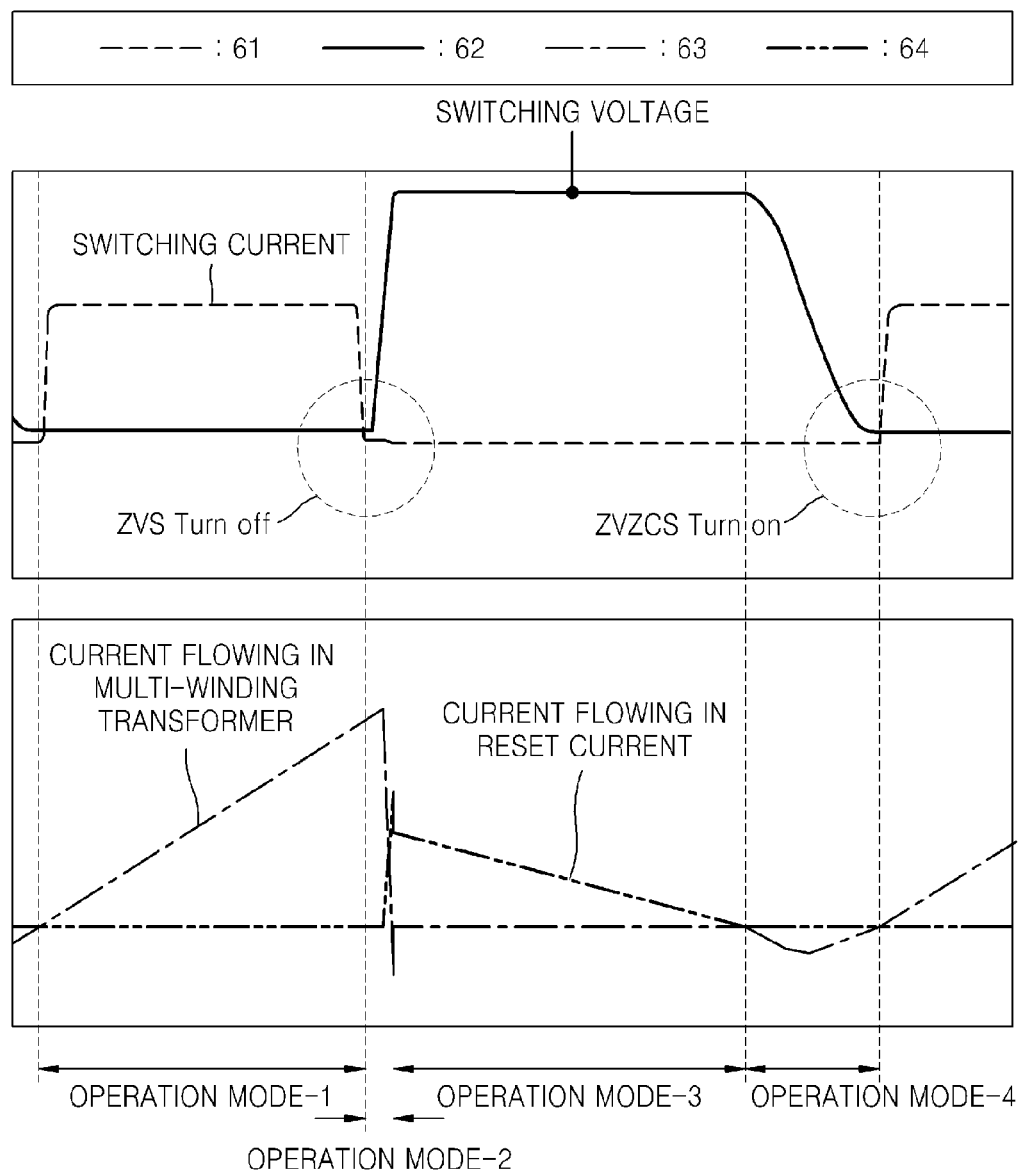
FIG. 6 are graphs illustrating operations of the balancing apparatus shown in FIG. 5.

FIG. 6 is a diagram illustrating operations of the balancing apparatus 10 shown in FIGS. 5A through 5D. The above descriptions about the balancing apparatus 10 also apply to FIG. 6, even though omitted below. An operation mode-1 denotes an operation of the balancing apparatus 10 in FIG. 5A, an operation mode-2, an operation mode-3, and an operation mode-4 respectively denote the operation of the balancing mode in FIGS. 5B, 5C, and 5D.

The operation mode-1 is the operation of the balancing apparatus 10 when the bi-directional switch 11 is closed. In the operation mode-1, a switching current 61 may increase from 0 (zero) and may be maintained at a constant value, and a switching voltage 62 may be maintained at 0 since the bi-directional switch 11 is closed. A current 63 flowing in the multi-winding transformer 63 may constantly increase, and a current 64 flowing in the reset circuit 14 may be 0. The switching current 61 may be reduced to 0 before the bi-directional switch 11 is turned off. The switching current 61 denotes the electric current flowing in the bi-directional switch 11.

The operation mode-2 is the operation of the balancing apparatus 10 right after the bi-directional switch 11 is opened. In the operation mode-2, the switching current 61 may be reduced to 0 before the bi-directional switch 11 is turned off, and may be maintained at 0 when the bi-directional switch 11 is in a turned off state. The switching voltage 62 may increase when the bi-directional switch 11 is turned off, and may reach a peak at a desired (and/or alternatively predetermined) level. The current 63 flowing in the multi-winding transformer 12 may increase, and the current 64 flowing in the reset circuit 14 may be maintained at 0 (zero).

The operation mode-3 is the operation of the balancing apparatus 10 when the voltage of the mutual inductance of the reset circuit 14 is greater than the voltage at the opposite terminals of the module 110. In the operation mode-3, the switching current 61 may be maintained at 0 and the switching voltage 62 may be maintained at the peak. The current 63 flowing in the multi-winding transformer 12 may be maintained at 0 when the current starts to flow in the reset circuit 14, and the current 64 flowing in the reset circuit 14 may be gradually reduced after being increased.

The operation mode-4 is the operation of the balancing apparatus 10 when the current does not flow in the reset circuit 14 anymore. In the operation mode-4, the switching current 61 may be maintained at 0, and the switching voltage 62 may be gradually reduced to 0 before the bi-directional switch 11 is closed again (zero voltage zero current switching turn on). The current 63 flowing in the multi-winding transformer 12 may flow in an opposite direction to that in the operation mode-1, and may be reduced to 0 before the bi-directional switch 11 is closed again. The current 64 flowing in the reset circuit 14 may be maintained at 0.

The balancing apparatus 10 measures voltages of the cell for a desired (and/or alternatively predetermined) period, and doses the switches of the selected cells for a desired (and/or alternatively predetermined) time period. Therefore, in order to operate as shown in FIG. 6, the balancing apparatus 10 may be designed to operate based on a time of opening and closing the switches. In more detail, the output capacitor and the mutual inductor included in the balancing apparatus 10 may be designed in consideration of the period of measuring the voltages and the time period in which the switches of the selected cells are closed.

Figure 7:
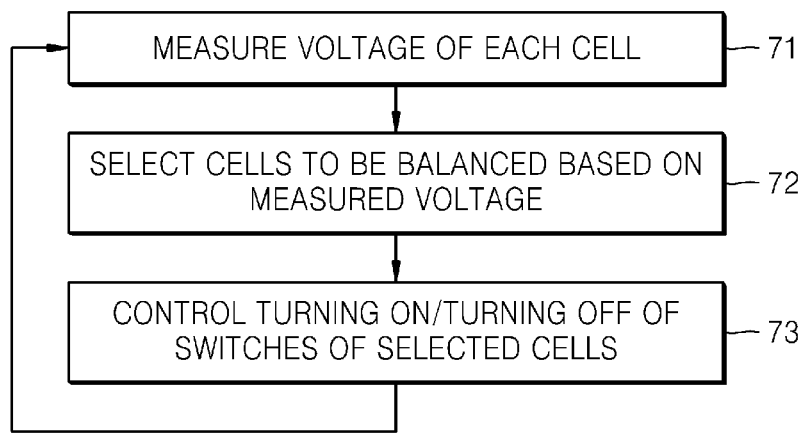
FIG. 7 is a flowchart illustrating a method of balancing cells, according to an example embodiment.

FIG. 7 is a flowchart illustrating a method of balancing the cells by the balancing apparatus 10, according to an example embodiment. Therefore, even though omitted, the above descriptions about the balancing apparatus 10 also apply to the method of FIG. 7.

In operation 71, the balancing apparatus 10 measures a voltage of each of a plurality of cells that are connected to each other in series. The balancing apparatus 10 may further include a device for measuring the voltages of the cells.

In operation 72, the balancing apparatus 10 selects cells that are to be balanced based on the measured voltages. The balancing apparatus 10 may select two cells, a voltage difference of which is the greatest.

In operation 73, the balancing apparatus 10 controls turning on/turning off of the switches that are connected to the selected cells. The switches are bi-directional switches that are respectively connected to the cells to control the flow of the electric current bi-directionally. The balancing apparatus 10 may control the turning on/turning off of the switches according to a desired (and/or alternatively predetermined) period.

Example embodiments can be written as computer programs and can be implemented in general-use digital computers that execute the programs using a computer-readable recording medium. Examples of the computer-readable recording medium include magnetic storage media (e.g., ROM, floppy disks, hard disks, etc.), and optical recording media (e.g., CD-ROMs, or DVDs).

The balancing apparatus may be used to balance the cells in a battery including the plurality of cells that are connected with each other in series. For example, the balancing apparatus 10 may be applied to electric vehicles, hybrid electric vehicles, electric bikes, uninterruptible power supplies, or portable appliances. However, example embodiments are not limited thereto.

A balancing operation between cells that are not adjacent to each other may be performed by using the multi-winding transformer that is connected to the cells.

The energy may be transferred directly between cells via the multi-winding transformer, and thus, energy loss may be reduced.

The energy loss generated when turning on/turning off the bi-directional switch may be reduced by adjusting the capacitance of the bi-directional switch and the inductance of the multi-winding transformer.

The number of windings of the multi-winding transformer may be adjusted in order to reduce (and/or prevent) an over-voltage from generating on the opposite terminals of the bi-directional switch.

It should be understood that the example embodiments described therein should be considered in a descriptive sense only and not for purposes of limitation. Descriptions of features or aspects within each example embodiment should typically be considered as available for other similar features or aspects in other example embodiments. Accordingly, while some example embodiments have been particularly shown and described, it will be understood by one of ordinary skill in the art that variations in form and detail may be made therein without departing from the spirit and scope of the claims.

What is claimed is:

1. A balancing apparatus configured to balance cells that are connected in series, the balancing apparatus comprising:
   bi-directional switches that are respectively connected to the cells,
   the bi-directional switches being configured to bi-directionally control a flow of an electric current;
   a controller configured to measure voltages of the cells,
   the controller being configured to select a number of the cells for balancing based on the measured voltages of the cells,
   the controller being configured to turn on and turn off the bi-directional switches that are connected to the selected cells based on the measured voltages; and
   a multi-winding transformer connected to the bi-directional switches,
   the multi-winding transformer being configured to transfer energy between the selected cells when the bi-directional switches connected to the selected cells are turned on;
   the multi-winding transformer including inductors, and
   an impedance of at least one of the inductors in the multi-winding transformer is greater than an impedance of at least one of the cells.

2. The balancing apparatus of claim 1, further comprising:
   a reset circuit connected to opposite terminals of a module including the cells, wherein
   the reset circuit includes a diode and a mutual inductor, and
   the mutual inductor of the reset circuit is correlated with the multi-winding transformer.

3. The balancing apparatus of claim 1, wherein
   the inductors in the multi-winding transformer have an equal number of windings, and
   the inductors of the multi-winding transformer are connected to the cells.

4. The balancing apparatus of claim 3, further comprising:
   a reset circuit connected to opposite terminals of a module including the cells, wherein
   the reset circuit includes a mutual inductor,
   the mutual inductor of the reset circuit is correlated with the inductors of the multi-winding transformer, and
   a number of windings in the mutual inductor of the reset circuit is greater than the number of windings in at least one of the inductors of the multi-winding transformer.

5. The balancing apparatus of claim 1, wherein the controller is configured to determine the selected cells based on selecting a cell having a highest voltage and selecting a cell having a lowest voltage among the cells.

6. The balancing apparatus of claim 1, wherein the controller is configured to determine the selected cells according to a priority set by the controller.

7. The balancing apparatus of claim 6, wherein the controller is configured to determine the selected cells based on a connecting order of the cells connected in series when at least two of the cells have equal measured voltages.

8. The balancing apparatus of claim 1, wherein
   one of the bi-directional switches includes a capacitor, and
   the one of the bi-directional switches is configured to form a resonant circuit between the capacitor in the one of the bi-directional switches and a corresponding inductor in the multi-winding transformer.

9. The balancing apparatus of claim 1, wherein
   a capacitance of one of the bi-directional switches and an inductance of one of the inductors in the multi-winding transformer are configured so that a voltage at opposite terminals of the one of the bi-directional switches has a minimum value when the one of the bi-directional switches is turned on, and
   the capacitance of the one of the bi-directional switches and the inductance of the one of inductors in the multi-winding transformer are configured so a current flowing in the one of the bi-directional switches has a minimum value when the one of the bi-directional switches is turned off.

10. The balancing apparatus of claim 1, wherein at least one of the bi-directional switches includes two synchronous rectifier n-channel metal oxide semiconductors (SR-NMOSs).

11. A battery module comprising:
    a plurality of cells that are connected to each other in series; and
    the balancing apparatus of claim 1, wherein
    the balancing apparatus is configured to select two of the plurality of cells and to balance the selected cells.

12. The balancing apparatus of claim 1, wherein the bi-directional switches each include two synchronous rectifier n-channel metal oxide semiconductors (SR-NMOSs), a built-in diode, and a capacitor.

13. A method of balancing a plurality of cells that are connected to each other in series, the method comprising:
    measuring a voltage of each of the plurality of cells;
    selecting a number of the plurality cells to be balanced based on the measured voltages;
    controlling bi-directional switches that are respectively connected to the plurality of cells such that some of the bi-directional switches connected to the selected cells are turned on and turned off, the bi-directional switches being configured to control a flow of an electric current bi-directionally;

the controlling the bi-directional switches including forming a resonant circuit between two of the selected cells and an inductor of a multi-winding transformer by turning the bi-directional switches connected to the two of the selected cells on, the multi-winding transformer being connected to the bi-directional switches, and an impedance of the inductor is greater than an impedance of at least one of the two selected cells.

14. The method of claim 13, wherein the selecting includes selecting a cell having a highest voltage among the measured voltages and selecting a cell having a lowest voltage among the measured voltages.

15. The method of claim 13, wherein the selecting includes selecting the cells to be balanced according to a priority that is set by a controller.

16. The method of claim 13, wherein the selecting includes selecting the cells based on a connecting order of the cells when at least two of the plurality cells have equal measured voltages.

17. The method of claim 13, wherein the bi-directional switches each include two synchronous rectifier n-channel metal oxide semiconductors (SR-NMOSs), a built-in diode, and a capacitor.

18. A balancing apparatus configured to balance cells that are connected in series, the balancing apparatus comprising:

bi-directional switches that are respectively connected to the cells, the bi-directional switches being configured to bi-directionally control a flow of an electric current;

a controller configured to measure voltages of the cells, the controller being configured to select a number of the cells for balancing based on the measured voltages of the cells, the controller being configured to turn on and turn off the bi-directional switches that are connected to the selected cells based on the measured voltages; and a multi-winding transformer connected to the bi-directional switches, the multi-winding transformer being configured to transfer energy between the selected cells when the bi-directional switches connected to the selected cells are turned on, wherein a capacitance of one of the bi-directional switches and an inductance of an inductor in the multi-winding transformer are configured so that a voltage at opposite terminals of the one of the bi-directional switches has a minimum value when the one of the bi-directional switches is turned on, and the capacitance of the one of the bi-directional switches and the inductance of the inductor in the multi-winding transformer are configured so a current flowing in the one of the bi-directional switches has a minimum value when the one of the bi-directional switches is turned off.

19. A battery module comprising:

a plurality of cells that are connected to each other in series; and the balancing apparatus of claim 18, wherein the balancing apparatus is configured to select two of the plurality of cells and to balance the selected cells.

* * * * *